(12) United States Patent
Pelton et al.

(10) Patent No.: US 9,792,663 B2
(45) Date of Patent: Oct. 17, 2017

(54) USER-DEFINED COMMAND BUFFER FORMATS SUPPORTING DATA-PARALLEL TRANSLATION

(71) Applicant: Microsoft Technology Licensing, LLC, Redmond, WA (US)

(72) Inventors: Blake Douglas Pelton, Redmond, WA (US); Alexander Nankervis, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/602,181

(22) Filed: Jan. 21, 2015

(65) Prior Publication Data
US 2016/0210719 A1 Jul. 21, 2016

Related U.S. Application Data

(60) Provisional application No. 62/092,253, filed on Dec. 15, 2014.

(51) Int. Cl.
| | |
|---|---|
| *G06T 1/00* | (2006.01) |
| *G06T 1/20* | (2006.01) |
| *G06T 1/60* | (2006.01) |
| *G06F 3/14* | (2006.01) |
| *G09G 5/36* | (2006.01) |

(52) U.S. Cl.
CPC ............ *G06T 1/20* (2013.01); *G06F 3/14* (2013.01); *G06T 1/60* (2013.01); *G09G 5/363* (2013.01)

(58) Field of Classification Search
CPC .................................. G06T 1/20; G06T 1/60
See application file for complete search history.

(56) References Cited

U.S. PATENT DOCUMENTS

| | | |
|---|---|---|
| 7,600,222 B2 | 10/2009 | Wilt et al. |
| 2009/0251475 A1 | 10/2009 | Mathur et al. |
| 2010/0122259 A1 | 5/2010 | Gosalia et al. |
| 2013/0021353 A1 | 1/2013 | Drebin et al. |
| 2013/0219378 A1 | 8/2013 | Glaister et al. |

OTHER PUBLICATIONS

Matt Sandy, DirectX 12, Mar. 20, 2014, DirectX Developer Blog, pp. 1-6, https://blogs.msdn.microsoft.com/directx/2014/03/20/directx-12/.*
International Search Report and Written Opinion Issued in PCT Application No. PCT/US2016/012301, Mailed Date: Apr. 4, 2016, 12 Pages.

(Continued)

*Primary Examiner* — Martin Mushambo
(74) *Attorney, Agent, or Firm* — Perkins Coie LLP (57) ABSTRACT

A facility for specifying a set of graphics commands for performance on behalf of an application is provided. The facility provides a first, command signature data structure specifying a list of resources capable of affecting the outcome of graphics commands among the set. The facility further provides a second, application-defined command buffer data structure that, for each of the graphics commands among a set, represents the graphics command by including a value for each of the resources of the list.

6 Claims, 3 Drawing Sheets

(56) References Cited

OTHER PUBLICATIONS

Sandy, Matt, "DirectX 12, DirectX Developer Blog—Site Home—MSDN Blogs", Retrieved at: <<http://blogs.msdn.com/b/directx/archive/2014/03/20/directx-12.aspx>>, Mar. 20, 2014, 3 Pages.
Smith, Ryan, "Microsoft Announces DirectX 12: Low Level Graphics Programming Comes to DirectX", Retrieved at: <<http://www.anandtech.com/show/7889/microsoft-announces-directx-12-low-level-graphics-programming-comes-to-directx/2>>, Mar. 24, 2014, 6 Pages.
"Second Written Opinion Issued in PCT Application No. PCT/US2016/012301," Mailed Date: Dec. 7, 2016, 6 Pages.
Coppock, Michael J., "Direct 3D 12 Overview Part 6: Command Lists | Intel Software," Retrieved From <<https://software.intel.com/en-us/blogs/2014/08/22/direct3d-12-overview-part-6-command-lists>>, Aug. 22, 2014, 2 Pages.

* cited by examiner

USER-DEFINED COMMAND BUFFER FORMATS SUPPORTING DATA-PARALLEL TRANSLATION

CROSS-REFERENCE TO RELATED APPLICATIONS

This application is related to U.S. Provisional Patent Application No. 62/092,253 filed on Dec. 15, 2014, which is hereby incorporated by reference in its entirety. In ways in which the present application and the document incorporated by reference are inconsistent, the present application controls.

TECHNICAL FIELD

The described technology is directed to the field of computer graphics rendering.

BACKGROUND

In conventional 3D computer graphics rendering, a Central Processing Unit ("CPU") generates a series of rendering commands that are then transferred to memory of a Graphics Processing Unit ("GPU"), which are then executed by the GPU.

Typically, an application executing on the CPU calls a 3D graphics application programming interface (API), such as Microsoft Direct3D, that is invariant across different types of GPUs from different manufacturers. A GPU-specific device driver installed on the computer system handles invocations of this API by generating rendering commands that are suited for the GPU that is in use on the computer system. These GPU-specific commands, when generated by the device driver and made available for execution by the GPU, are sometimes referred to as a GPU-specific command buffer.

DETAILED DESCRIPTION

The inventors have recognized significant disadvantages of conventional approaches to generating rendering commands for a GPU. In particular, where a GPU-specific command buffer is generated by a GPU-specific device driver executing on the CPU as described above, the inventors have recognized that the work of the CPU and the GPU are often poorly coordinated, resulting in disadvantageously low throughput of graphics commands, and relatively low graphics performance on behalf of the application. This observation relates to the nature of graphics processing, in which rendering produces an ordered series of video frames for display on the display device. Specifically, the inventors have noted that the processors operate most efficiently in a situation in which the GPU is doing its work on a particular frame of the series of frames—or a particular portion of a frame—on which the CPU has completed its work. While this situation is maintained, both processors are operating continuously, or at least each is waiting for the other to a more limited extent. The inventors have recognized that, in the conventional approach described above, the two processors are prevented from actively operating simultaneously where the CPU's processing of the second half of a particular frame relies on data generated by the GPU in processing the first half of the same frame. In this situation, after processing the first half of the frame, the CPU must wait and permit the GPU to catch up with the CPU before the CPU has the data it needs to proceed with the second half of the frame. While the CPU is doing so, the GPU is idle, unable to do its work on the second half of the frame until the CPU has completed its work on the second half of the frame. Further, in this situation, it may be inefficient for the CPU to access data generated by the GPU, either because the two processors are connected to separate memories, or because there is no sufficient cache coherency mechanism between the two processors. Additionally, the inventors have recognized that the driver software running on the CPU consumes valuable CPU processing resources which can be better spent on other processing tasks.

In view of these and other shortcomings, the inventors have conceived and reduced to practice a software and/or hardware facility for generating a GPU-specific command buffer by performing a data-parallel translation of a GPU-agnostic, application-defined command buffer constructed by the application, executing either on the CPU or on the GPU.

In some examples, the facility permits applications to generate a wide range of GPU commands in a hardware-independent format. In some examples, the facility provides rules that application-generated commands follow to enable a data-parallel translation from the hardware-independent format to a hardware-dependent format.

In some examples, the facility performs a data-parallel translation of the application-defined command buffer using the GPU, executing a GPU-specific compute kernel ("mini-driver") to perform the translation using multithreading and/or single-instruction multiple-data (SIMD) instructions. In some examples, the facility performs the data-parallel translation of the application-defined command buffer using the CPU, executing a driver adapted to perform the translation using multithreading and/or single-instruction multiple-data (SIMD) instructions.

Each application-defined command buffer is a sequence of rendering commands all of the same command type. The application-defined command buffer is divided into fixed-length records, each corresponding to a different one of the commands of the set of commands. For each command of the set, its record specifies just the resource bindings, raw data values, data pointers, instruction pointers, and parameters that affect fixed-function portions of the 3D graphic pipeline and vary among the commands of the set of commands. The remaining resource bindings, data values, pointers, and parameters are inherited from the GPU's preexisting context, which may be set on behalf of all of the commands of the set immediately before the GPU-specific command buffer is executed by the GPU. For each application-defined command buffer the application generates, it identifies a command signature used to interpret and translate the application-defined command buffer into a GPU-specific command buffer. The command signature data structure specifies the fixed size of the records of the application-defined command buffer; the command type that is common to all of the commands of the set represented in the application-defined command buffer—i.e., the draw function that is called by each of these commands; and a list of the resource bindings, data values, pointers, and parameters that can vary among the commands of the set. A command signature generated by the application for a first set of commands can be reused for subsequent sets of commands having the same format, i.e., those sharing the same characteristics specified by the command signature. As part of translating an application-defined command buffer to a GPU-specific command buffer, the facility uses the command signature to lay out the GPU-specific command buffer in memory; to identify for each command the source address of the corresponding record of the application-defined command buffer and the address of the corresponding record of the GPU-specific command. For each command of the set represented by the application-defined command buffer, the facility provisions a compute kernel invocation with an index integer usable to determine these source and destination addresses, the command type that is common to the commands of the set, and the set of resource bindings, data values, pointers, and parameters that can vary among the commands and are therefore present in each of the records of the application-defined command buffer. Each compute kernel invocation performs the translation of a single command, transforming the record for the command in the application-defined command buffer to the record corresponding to the command in the GPU-specific command buffer. In particular, this transformation places the command in a form expected by the GPU, and thus the exact nature of the transformation varies among different GPUs. The facility maps the compute kernel invocations to a set of threads that performs these invocations, such as in parallel.

By performing in some or all of these ways, the facility permits the processing capacity of the computer system's CPU and GPU to be more fully utilized, producing higher throughput and better graphics performance. This can enable the computer system to, for example, serve the application at a higher frame rate; serve the application at a higher level of frame complexity; serve multiple applications simultaneously; achieve the same level of processing with less powerful processors; etc. Further, the facility is extensible to any type of GPU merely by specifying the transformation process from application-defined command buffer to GPU-specific command buffer needed to leave the GPU-specific command buffer in a proper form to be executed by GPUs of that type.

Figure 1:
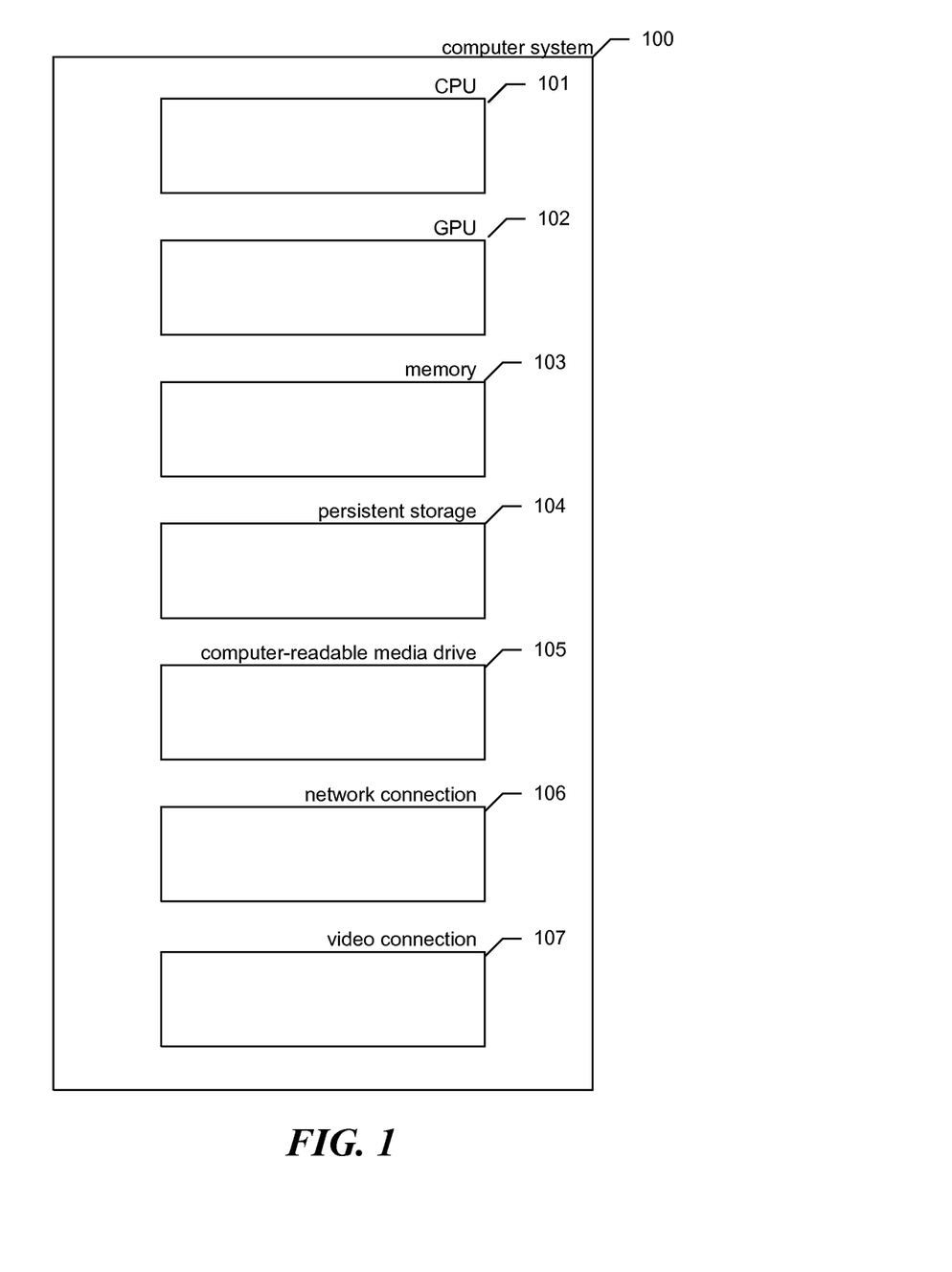
FIG. 1 is a block diagram showing exemplary components that may be incorporated in at least some of the computer systems and other devices on which a facility operates.

FIG. 1 is a block diagram showing some of the components that may be incorporated in at least some of the computer systems and other devices on which the facility operates. In various examples, these computer systems and other devices 100 can include server computer systems, desktop computer systems, laptop computer systems, netbooks, mobile phones, personal digital assistants, televisions, cameras, automobile computers, electronic media players, etc. In various examples, the computer systems and devices may include any number of the following: a central processing unit ("CPU") 101 for executing computer programs; a graphics processing unit ("GPU") for executing visual rendering commands and other related operations; a computer memory 103 for storing programs and data while they are being used, including the facility and associated data, an operating system including a kernel, and device drivers—in some examples, certain memory devices are accessible by one or more CPUs, one or more GPUs, or both; a persistent storage device 104, such as a hard drive or flash drive for persistently storing programs and data; a computer-readable media drive 105, such as a floppy, CD-ROM, or DVD drive, for reading programs and data stored on a computer-readable medium; a network connection 106 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; and/or a video connection for driving one or more connected video displays (not shown). While computer systems configured as described above may be used to support the operation of the facility, those skilled in the art will appreciate that the facility may be implemented using devices of various types and configurations, and having various components.

Figure 2:
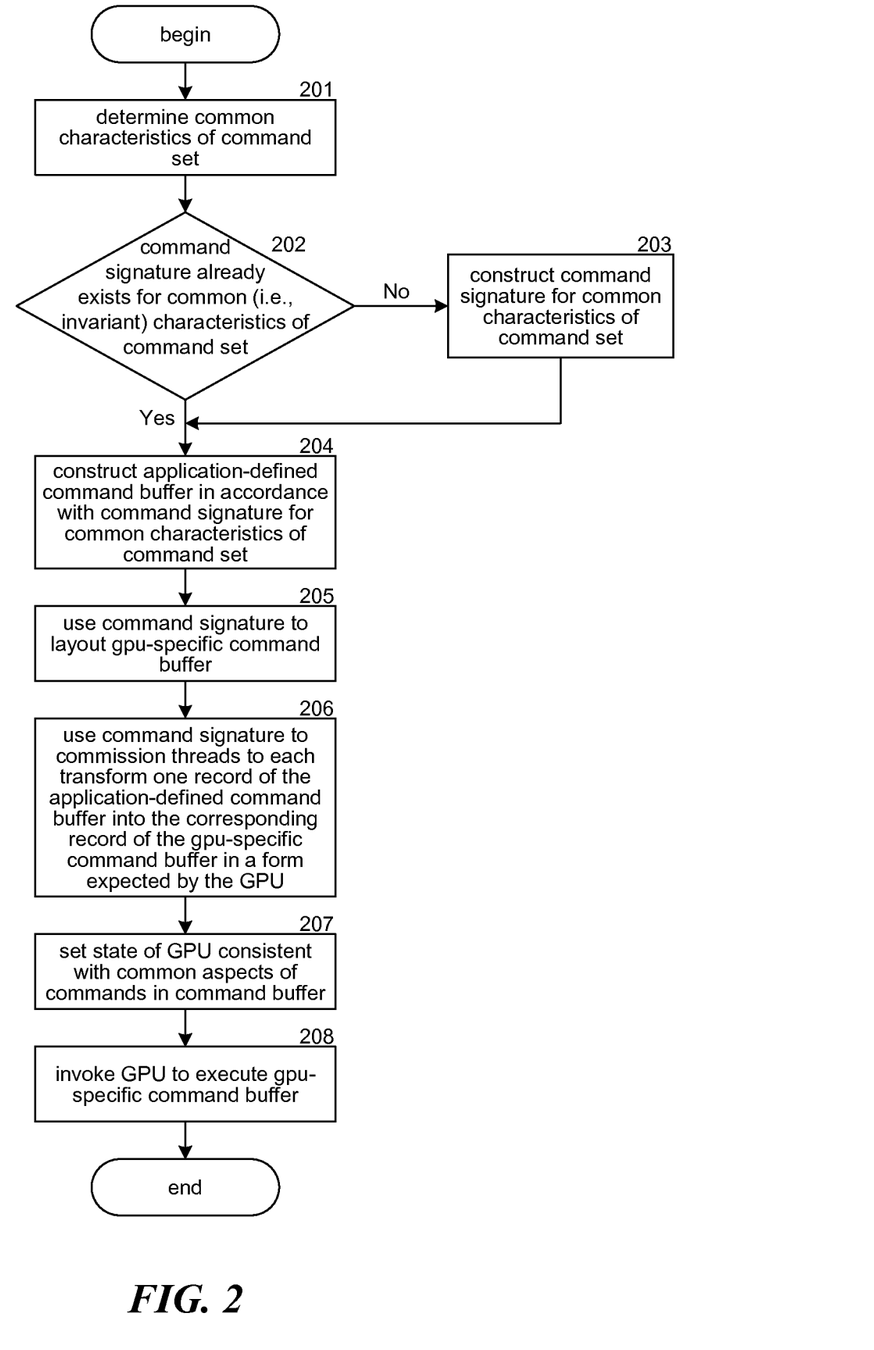
FIG. 2 is a flow diagram showing steps typically performed by the facility in some examples to generate an application-defined command buffer representing a set of commands, and translate it into a GPU-specific command buffer that can be processed by the GPU.

FIG. 2 is a flow diagram showing steps typically performed by the facility in some examples to generate an application-defined command buffer representing a set of commands, and translate it into a GPU-specific command buffer that can be processed by the GPU. In step 201, the application explicitly specifies at least some common characteristics that were used as a basis for generating a command. Alternatively, the facility analyzes the commands of the command set to identify their common characteristics. These common characteristics at least include the identity of the single command type used by all the commands in the set. In various examples, it may also include one or more arguments of the command, and a variety of different kinds of state of the GPU, including the value of certain constants. In some examples (not shown), the facility specifies a maximum command count used by the driver to determine the size and memory of the GPU-specific command buffer. Also, a pointer to GPU-accessible memory is provided as a basis for storing in GPU-accessible memory the actual command count, which is less than or equal to the maximum command count. The number of compute kernel invocations executed by the GPU will be somewhere between the maximum count and the actual count. Each kernel invocation checks to see if it corresponds to a command which is beyond the actual command count. Kernel invocations can emit NOP or JUMP instructions into the GPU-specific command buffer.

In step 202, if a command signature has already been established for the common characteristics identified in step 201 of the command set, then the facility continues in step 204, else the facility continues in step 203. In step 203, the facility constructs a command signature reflecting the common characteristics identified for the command set in step 201. After step 203, the facility continues in step 204. Steps 201-203 discussed above are typically performed by the CPU, often by the application executing on the CPU, either directly, or using an API provided, for example, by the operating system or by advice.

Figure 3:
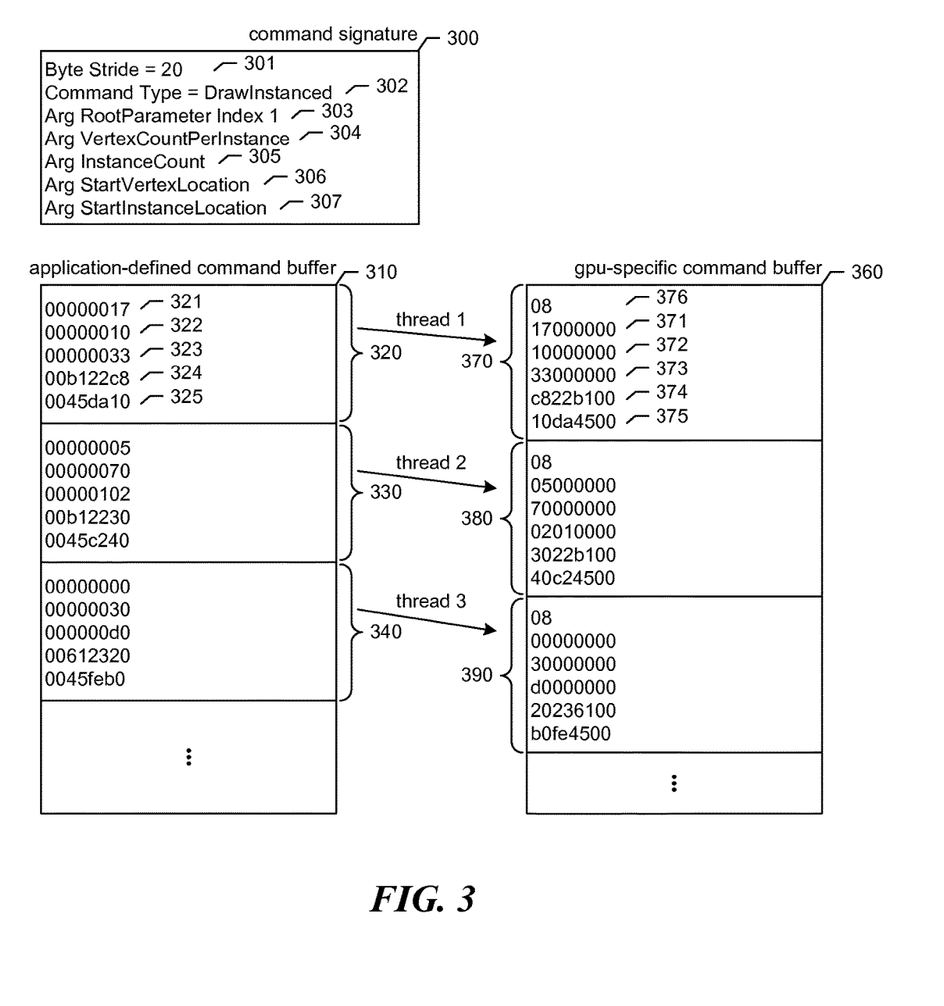
FIG. 3 is a data structure diagram showing a sample command signature, a sample application-defined command buffer, and a GPU-specific command buffer generated by the facility from the application-defined command buffer.

FIG. 3 is a data structure diagram showing a sample command signature, a sample application-defined command buffer, and a GPU-specific command buffer generated by the facility from the application-defined command buffer. The sample command signature 300, constructed in step 203, contains the following information: a byte stride value 301 specifying the size of every record in the application-defined command buffer; a command type value 302 identifying the command that is to be invoked on the GPU for each of the GPU-specific command buffer records; an argument specification 303 specifying that the first value of each application-defined command buffer record is a value of a particular constant component of the GPU state which can vary across records of the application-defined command buffer; and argument specifications 304-307 each corresponding to one of the arguments of the DrawInstanced command type, which constitutes the second through fifth values in each record of the application-defined command buffer.

Returning to FIG. 2, in step 204, the application constructs an application-defined command buffer in accordance with the command signature for the common characteristics of the command set. In various examples, the application generates the application-defined command buffer on the CPU or on the GPU.

Returning to FIG. 3, sample application-defined command buffer 310 is generated by the facility in step 204 based upon the sample command signature 300. The application-defined command buffer 310 is a series—or array—of fixed-linked records, including initial records 320, 330, and 340. These records each have a size in memory corresponding to the byte stride value specified in the command signature. In some examples (not shown), the records of the application-defined command buffer include unused padding space in order to better align the start of each record in memory. It can be seen that each record of the application-defined command buffer contains an ordered series of five values, such as values 321-325 in record 320. These values and their order correspond to the argument specifications and their order in the command signature. For example, in record 320, value 321, "00000017," is specified the constant having index 1 for the command corresponding to record 320. Similarly, value 322 in record 320, "00000010," is the value for the same command of the VertexCountPerinstance argument of the DrawInstanced command type.

In step 205, the facility uses the command signature to lay out an initially-empty GPU-specific command buffer corresponding to the application-defined command buffer, into which the application-defined command buffer will be translated. In some examples, the facility's performance of step 205 is sensitive to details of the GPU that affect the proper size of records in the GPU-specific command buffer, such that they can be properly processed by the GPU. In laying out the example GPU-specific command buffer 360, the facility adds to the size of records in the application-defined command buffer the size of an opcode corresponding to the DrawInstanced command type that must be read by the GPU as part of processing each record. In step 206, the facility uses the command signature to commission compute kernel invocations to each transform one record of the application-defined command buffer into the corresponding record of the GPU-specific command buffer in a form expected by the GPU. Each such invocation receives an integer index of the record that it uses to determine a source pointer to one record of the application-defined command buffer and a destination pointer to the corresponding record of the GPU-specific command buffer. The invocation executes logic reflecting the requirements that the GPU imposes on the GPU-specific command buffer. The facility then maps the commission compute kernel invocations each to a thread for execution. For example, FIG. 3 shows thread 1 using this technique to transform record 320 in the application-defined command buffer into record 370 in the GPU-specific command buffer. In addition to adding the opcode "08" at the beginning of record 370, the logic used by the thread reverses the order of values 321-325 to obtain values 371-375 as required by GPUs of this type. The threads commissioned by the facility in step 206 typically execute in parallel. In some examples, instead of or in addition to commissioning a large number of threads to translate records as discussed above, the facility uses SIMD instructions to introduce data parallelism into the translation process.

While FIG. 3 shows data structures whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

In step 207, the facility sets the state of the GPU consistent with the invariant aspects of the commands in the command buffers. In terms of the example shown in FIG. 3, this may involve setting particular values of constants having indices other than one. In step 208, the facility invokes the GPU to execute, in the context of the state established in step 209, the GPU-specific command buffer to give effect to the graphics commands needed by the application.

In some examples, steps 205-208 discussed above are performed by the CPU, such as in executing a device driver specific to the GPU. In doing so, in various examples, the CPU uses a variety of data-parallel techniques, such as multithreading, SIMD commands, and/or others.

In some examples, steps 205-208 are performed by the GPU, executing a compute kernel specific to the GPU. Here, the GPU uses data-parallel techniques such as multithreading.

After step 208, these steps conclude. These steps may be reinvoked to handle subsequent command sets needed by the application.

Those skilled in the art will appreciate that the steps shown in FIG. 2 may be altered in a variety of ways. For example, the order of the steps may be arranged; some steps may be performed in parallel; shown steps may be omitted, or other steps may be included; a shown step may be divided into substeps, or multiple shown steps may be combined into a single step, etc.

Additional details regarding the facility in some examples including sample command sets in corresponding command buffers, follow.

As one example, suppose an application wants a unique constant to be specified per-draw call. The application would create a command signature that enables the indirect argument buffer to specify the following parameters per draw call:

Draw arguments (Vertex Count, Instance Count, . . . )
The value of 1 constant

The indirect argument buffer generated by the application would contain an application-defined command buffer of fixed-size records. Each structure corresponds to 1 draw call. Each structure contains the drawing arguments, and the value of the constant. The number of draw calls is specified in a separate GPU-visible buffer.

The following structures define how particular arguments appear in an indirect argument buffer.

```
struct Command
{
    UINT ConstantValue;
    UINT VertexCount;
    UINT InstanceCount;
    UINT StartVertex;
    UINT
}
```

Plain Multidrawindirect

In this example, the indirect argument buffer generated by the application holds an array of 36-byte structures. Each structure only contains the 5 parameters passed to DrawIndexedInstanced (plus padding).

The code to create the command signature description is:

```
D3D12_INDIRECT_PARAMETER Args[1];
    Args[0].Type                                =
D3D12_INDIRECT_PARAMETER_TYPE_DRAW_INDEXED_
INSTANCED;
    D3D12_COMMAND_SIGNATURE_DESC ProgramDesc;
    ProgramDesc.ByteStride = 36;
    ProgramDesc.ArgumentCount = 1;
    ProgramDesc.pArguments = Args;
```

The layout of a single structure within an indirect argument buffer is:
  Bytes 0:3 IndexCountPerinstance
  Bytes 4:7 InstanceCount
  Bytes 8:11 StartIndexLocation
  Bytes 12:15 BaseVertexLocation
  Bytes 16:19 StartInstanceLocation
  Bytes 20:35 Padding Root Constants+Vertex Buffers In this example, each structure in an indirect argument buffer changes 2 constants, changes 1 vertex buffer binding, and performs 1 drawing non-indexed operation. There is no padding between structures.

The code to create the command signature description is:

```
D3D12_INDIRECT_PARAMETER Args[4];
Args[0].Type = D3D12_INDIRECT_PARAMETER_TYPE_
CONSTANT;
Args[0].ConstantRootParameterIndex = 2;
Args[1].Type = D3D12_INDIRECT_PARAMETER_TYPE_
CONSTANT;
Args[1].Constant.RootParameterIndex = 6;
Args[2].Type = D3D12_INDIRECT_PARAMETER_TYPE_VERTEX_
BUFFER;
Args[2].VertexBuffer.VBSlot = 3;
    Args[3].Type                                =
D3D12_INDIRECT_PARAMETER_TYPE_DRAW_INSTANCED;
    D3D12_COMMAND_SIGNATURE_DESC ProgramDesc;
    ProgramDesc.ByteStride = 40;
    ProgramDesc.ArgumentCount = 4;
    ProgramDesc.pArguments = Args;
```

The layout of a single structure within the indirect argument buffer is:
  Bytes 0:3 Data for root parameter index 2
  Bytes 4:7 Data for root parameter index 6
  Bytes 8:15 Virtual address of VB (64-bit)
  Bytes 16:19 VB stride
  Bytes 20:23 VB size
  Bytes 24:27 VertexCountPerinstance
  Bytes 28:31 InstanceCount
  Bytes 32:35 StartVertexLocation
  Bytes 36:39 StartInstanceLocation Applications perform indirect draws/dispatches via the following API:

```
void ID3D12CommandList::ExecuteIndirect(
    ID3D12CommandSignature* pCommandSignature,
    UINT MaxCommandCount,
    ID3D12Resource* pArgumentBuffer,
    UINT64 ArgumentBufferOffset,
    ID3D12Resource* pCountBuffer,
    UINT64 CountBufferOffset
);
```

Max command count specifies the maximum number of drawing operations which will be performed. The actual number of drawing operations to be performed are defined by a 32-bit unsigned integer contained in pCountBuffer (at the byte offset specified by CountBufferOffset).

The semantics of this API are defined with the following pseudo-code:

```
// Read draw count out of count buffer
UINT CommandCount = pCountBuffer->ReadUINT32
(CountBufferOffset);
CommandCount = min(CommandCount, MaxCommandCount)
// Get pointer to first Commanding argument
BYTE* Arguments = pArgumentBuffer->GetBase( ) +
ArgumentBufferOffset;
for(UINT CommandIndex = 0; CommandIndex <
CommandCount; CommandIndex++)
{
    // Interpret the data contained in *Arguments
    // according to the command signature
    pCommandSignature->Interpret(Arguments);
    Arguments += pCommandSignature ->GetByteStride( );
}
```

The debug layer will issue an error if either the count buffer or the argument buffer are not in the D3D12_RESOURCE_USAGE_INDIRECT_ARGUMENT state.

The core runtime will validate:
CountBufferOffset and ArgumentBufferOffset are 4-byte aligned
pCountBuffer and pArgumentBuffer are buffer resources (any heap type)
The offset implied by MaxCommandCount, ArgumentBufferOffset, and the drawing program stride do not exceed the bounds of pArgumentBuffer (similarly for count buffer)
The command list is a direct command list or a compute command list (not bundle/copy)
The debug layer will validate:
The root signature of the command list matches the root signature of the command signature
ID3D12CommandList::DrawInstanced Indirect and ID3D12CommandList::DrawIndexedInstancedIndirect are removed from the D3D12 API because they can be implemented with the features described here.

State leakage: ExecuteIndirect is defined to reset all bindings affected by the ExecuteIndirect to known values. In particular.
  If the command signature binds a VB to a particular slot, then after ExecuteIndirect is called, a NULL VB is bound to that slot
  If the command signature binds an IB, then after ExecuteIndirect, a NULL IB is bound.
  If the command signature sets a constant, then after ExecuteIndirect is called, the constant value is set to 0
  If the command signature sets a root view (CBV/SRV/UAV), then after ExecuteIndirect is called, the root view is set to a NULL view.

This enables drivers to easily track bindings. This is implemented by the D3D12 runtime by making a series of DDI calls after the ExecuteIndirect is called.

A new API is added whereby an application can retrieve the GPU virtual address of a buffer.

typedef UINT64 D3D12_GPU_VIRTUAL_ADDRESS;
D3D12_GPU_VIRTUAL_ADDRESS
ID3D12Resource::GetGPUVirtualAddress( );

Applications are free to apply byte offsets to virtual addresses before placing them in an indirect argument buffer. Note that all of the D3D12 alignment requirements for VB/IB/CB still apply to the resulting GPU virtual address.

This API returns 0's for non-buffer resources.

In some examples, the facility provides one or more instances of computer-readable media collectively having contents capable of causing a computing system to perform a method for generating a GPU-specific command buffer representing a set of graphics commands. The method comprises: accessing a first command buffer comprising an array of fixed-length records each corresponding to different graphics command of the set, each record of the first command buffer expressing the graphics command to which it corresponds in a manner that is not adapted to requirements of any particular GPU type; and generating from the first command buffer a second command buffer comprising an array of fixed-length records each corresponding to different graphics command of the set, each record of the second command buffer expressing the graphics command to which it corresponds in a manner that is adapted to requirements of a selected GPU type.

In some examples, the facility provides a method in a computing system for specifying a set of graphics commands for performance on behalf of an application. The method comprises: providing a first, command signature data structure specifying a list of resources capable of affecting the outcome of graphics commands among the set; and providing a second, application-defined command buffer data structure that, for each of the graphics commands among a set, represents the graphics command by including a value for each of the resources of the list.

In some examples, the facility provides one or more instances of computer-readable media collectively storing a first, command signature data structure describing the composition of a second data structure representing a set of graphics commands. The first data structure comprises: first information identifying command type to which all of the graphics commands of the set correspond; and second information adequate to derive a list of resources capable of affecting the outcome of graphics commands of the identified command type that are variable across the set of graphics commands, wherein the contents of the first data structure are usable to construct and interpret the second data structure.

In some examples, the facility provides or more instances of computer-readable media collectively storing a first, application-defined command buffer data structure representing a set of graphics commands. The first the data structure comprises: a plurality of entries, each entry corresponding to a different graphics command among the set, each entry expressing the graphics command to which it corresponds in a manner that is not adapted to requirements of any particular GPU type, wherein the contents of the first data structure are translatable to a second data structure expressing the graphics commands of the set in a manner that is adapted to requirements of a particular GPU type.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. One or more units of computer-readable media collectively storing a command signature data structure describing the composition of a second data structure representing a set of graphics commands, none of the units of computer-readable media being a transitory signal, the command signature data structure comprising:
   first information identifying a command type to which all of the graphics commands of the set correspond; and
   second information adequate to allow for derivation of a list of resources configured to selectively affect the outcome of graphics commands of the identified command type that are variable across the set of graphics commands,
wherein the contents of the command signature data structure are usable to construct and interpret the second data structure,
and wherein the second information enumerates the list of variable resources and explicitly specifies an order among them.

2. One or more units of computer-readable media collectively storing a command signature data structure describing the composition of a second data structure representing a set of graphics commands, none of the units of computer-readable media being a transitory signal, the command signature data structure comprising:
   first information identifying a command type to which all of the graphics commands of the set correspond; and
   second information adequate to allow for derivation of a list of resources configured to selectively affect the outcome of graphics commands of the identified command type that are variable across the set of graphics commands,
wherein the contents of the command signature data structure are usable to construct and interpret the second data structure,
and wherein the second information is usable with the first information to discern the list of variable resources and an order among them.

3. One or more units of computer-readable media collectively storing a command signature data structure describing the composition of a second data structure representing a set of graphics commands, none of the units of computer-readable media being a transitory signal, the command signature data structure comprising:
   first information identifying a command type to which all of the graphics commands of the set correspond; and
   second information adequate to allow for derivation of a list of resources configured to selectively affect the outcome of graphics commands of the identified command type that are variable across the set of graphics commands,
wherein the contents of the command signature data structure are usable to construct and interpret the second data structure,
and wherein the second data structure is comprised of fixed-length records each corresponding to a single graphics command of the set, the command signature data structure further comprising:
   third information specifying a size of all the fixed-length records of the second data structure.

4. One or more units of computer-readable media collectively storing an application-defined command buffer data structure representing a set of graphics commands, none of the units of computer-readable media being a transitory signal, the application-defined command buffer data structure comprising:

a plurality of entries, each entry corresponding to a different graphics command among the set, each entry expressing the graphics command to which it corresponds in a manner that is not adapted to requirements of any particular GPU type, wherein the contents of the application-defined command buffer data structure are translatable to a second data structure expressing the graphics commands of the set in a manner that is adapted to requirements of a particular GPU type, and wherein each entry of the application-defined command buffer data structure has the same size.

5. The one or more units of computer-readable media of claim 4 wherein the entries are organized in a manner that facilitates the use of parallel processing techniques in translating the first data structure to the second data structure.

6. The one or more units of computer-readable media of claim 4 wherein the entries all fail to contain any information about at least one resource capable of affecting the outcome of graphics commands of the set that are invariant across the set of graphics commands.

\* \* \* \* \*